(12) United States Patent
Kim

(10) Patent No.: US 12,295,527 B2
(45) Date of Patent: May 13, 2025

(54) CUP LINER FOR BLENDER

(71) Applicant: Jonathan Kim, Cashmere, WA (US)

(72) Inventor: Jonathan Kim, Cashmere, WA (US)

( * ) Notice: Subject to any disclaimer, the term of this patent is extended or adjusted under 35 U.S.C. 154(b) by 865 days.

(21) Appl. No.: 17/385,115

(22) Filed: Jul. 26, 2021

(65) Prior Publication Data

US 2023/0022197 A1 Jan. 26, 2023

(51) Int. Cl.
- *A47J 43/00* (2006.01)
- *A47J 43/046* (2006.01)
- *A47J 43/07* (2006.01)
- *A47J 43/08* (2006.01)

(52) U.S. Cl.
CPC ......... *A47J 43/0727* (2013.01); *A47J 43/046* (2013.01); *A47J 43/085* (2013.01)

(58) Field of Classification Search
CPC ............................ A47J 43/0727; A47J 43/046
See application file for complete search history.

(56) References Cited

U.S. PATENT DOCUMENTS

| | | | |
|---|---|---|---|
| 2015/0258514 A1* | 9/2015 | Boozer | A47J 43/0727 366/142 |
| 2017/0209000 A1* | 7/2017 | Dickson, Jr. | B01F 35/511 |
| 2019/0001288 A1* | 1/2019 | Ciepiel | B01F 35/2117 |

* cited by examiner

*Primary Examiner* — Anshu Bhatia
(74) *Attorney, Agent, or Firm* — Chang & Hale LLP

(57) ABSTRACT

In some embodiments, a liner for a blender can include a body dimensioned to fit within a cup for the blender. The body can define an inner volume and include an opening with a perimeter configured to engage a perimeter of an opening of the cup, such that when the liner is positioned within the cup, the resulting assembly is capable of being mechanically coupled with a blade assembly to enclose the volume with one or more ingredients therein for blending operation by the blender.

17 Claims, 17 Drawing Sheets

CUP LINER FOR BLENDER

BACKGROUND

Field

The present disclosure relates to devices, assemblies and methods associated with cup liners for blenders.

Description of the Related Art

A blender typically includes a base unit having a motor and configured to receive a container. Such a container is dimensioned to receive a volume of ingredient(s) to be blended by a blade assembly positioned on one end of the container and powered by the motor when the container is mounted on the base unit.

For some blenders, an end of a container where a blade assembly is positioned is dedicated for mounting the container onto a base unit. Accordingly, such a container typically includes a lid assembly on the other end (e.g., on the upper portion of the container when the container is mounted on the base unit) to allow one or more unblended ingredients to be introduced into the container and to allow a blended mixture to be removed from the container.

For some blenders, a container has an opening on one end for introducing one or more unblended ingredients into the container and for removing a blended mixture from the container. The same end of the container is configured to mate with a blade assembly that is in turn configured to allow the container to be mounted onto a base unit for blending operation.

SUMMARY

In some implementations, the present disclosure relates to a liner for a blender. The liner includes a body dimensioned to fit within a cup for the blender, and defines an inner volume and includes an opening with a perimeter configured to engage a perimeter of an opening of the cup. When the liner is positioned within the cup, the resulting assembly is capable of being mechanically coupled with a blade assembly to enclose the volume with one or more ingredients therein for blending operation by the blender.

In some embodiments, the perimeter of the liner can include a lip dimensioned to engage the perimeter of the cup and to allow the blade assembly to be mechanically coupled with the assembly of the liner positioned within the cup. In some embodiments, the lip of the liner can be configured such that the blade assembly, when mechanically coupled to the assembly of the liner positioned within the cup, forms a seal to contain the one or more ingredients within the liner during the blending operation. In some embodiments, the lip of the liner can include a feature configured to retain the perimeter of the liner relative to the perimeter of the cup when the liner is positioned within the cup. In some embodiments, the feature of the lip can include, for example, a bead structure.

In some embodiments, the body of the liner can include an inner surface and an outer surface such that the inner surface defines the inner volume and the outer surface faces an inner surface of the cup. In some embodiments, the outer surface of the liner can have a shape that is different than a shape of the inner surface of the cup. In some embodiments, the outer surface of the liner can have a shape substantially similar to a shape of the inner surface of the cup.

In some embodiments, the outer surface of the liner can have a shape selected to provide a substantial contact with the inner surface of the cup when the liner is positioned within the cup. In some embodiments, the outer surface of the liner can have a shape selected to provide a space between the liner and the inner surface of the cup when the liner is positioned within the cup. In some embodiments, the outer surface of the liner can include one or more features implemented to engage the inner surface of the cup to provide the space between the liner and the inner surface of the cup when the liner is positioned within the cup. In some embodiments, each of the one or more features of the outer surface of the liner can be dimensioned to reduce resistance of motion associated with trapped air when the liner is being inserted into or removed from the cup.

In some implementations, the present disclosure relates to a kit that includes a liner for a blender. The liner includes a body dimensioned to fit within a cup for the blender. The body defines an inner volume and includes an opening with a perimeter configured to engage a perimeter of an opening of the cup. When the liner is positioned within the cup, the resulting assembly is capable of being mechanically coupled with a blade assembly to enclose the volume with one or more ingredients therein for blending operation by the blender. The kit further includes a printed instruction configured to facilitate use of the liner.

In some embodiments, the kit can further include the cup. In some embodiments, the perimeter of the liner can include a lip dimensioned to engage the perimeter of the cup and to allow the blade assembly to be mechanically coupled with the assembly of the liner positioned within the cup. In some embodiments, the lip of the liner can include a feature configured to retain the perimeter of the liner relative to the perimeter of the cup when the liner is positioned within the cup. In some embodiments, the perimeter of the cup can include a recess dimensioned to accommodate the feature of the lip.

In some embodiments, the body of the liner can include an inner surface and an outer surface such that the inner surface defines the inner volume and the outer surface faces an inner surface of the cup. In some embodiments, the outer surface of the liner can have a shape substantially similar to a shape of the inner surface of the cup. In some embodiments, either or both of the outer surface of the liner and the inner surface of the cup can be configured to provide a space between the liner and the cup when the liner is positioned within the cup.

In some embodiments, the kit can further include the blade assembly. In some embodiments, the kit can further include a motor base configured to allow an assembly of the blade assembly mechanically coupled to the assembly of the liner and the cup to be mounted thereon for the blending operation.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1:
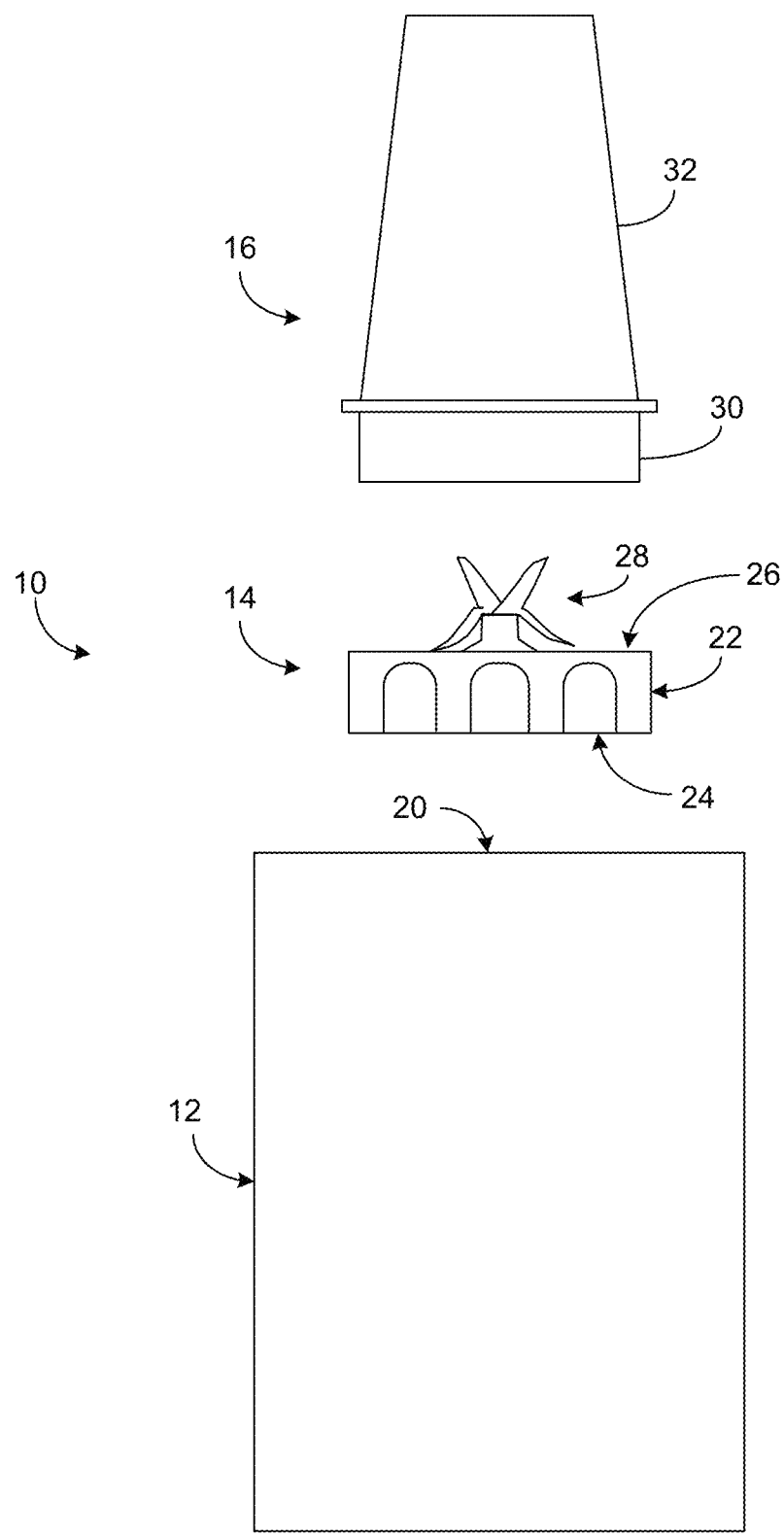
FIG. 1 depicts a conventional blender that includes a base unit, a blade assembly and a container having one open end configured to mate with the blade assembly.

FIG. 1 depicts a conventional blender 10 that includes a base unit 12, a blade assembly 14 and a container 16. The container 16 has one open end with a mating portion 30 configured to mate with the blade assembly 14. The mating portion 30 is shown to be an extension of a cup portion 32 having a closed end opposite from the open end of the mating portion 30. Accordingly, the container 16 is sometimes referred to as a cup, and such a cup can be enclosed by securing the blade assembly 14 onto its open end.

Referring to FIG. 1, the blade assembly 14 is shown to include a cap 22 having a container side 26 and a base side 24, with a set of blades 28 implemented on the container side 26. The container side 26 of the cap 22 is configured to mate with the mating portion 30 of the container 16 in a removable manner, and the base side 24 of the cap 22 is configured to couple with a coupling portion 20 of the base unit 12. The set of blades 28 is typically coupled mechanically to an engagement mechanism on the base side 24 of the cap 22. Accordingly, when the cap 22 is coupled to the coupling portion 20 of the base unit 12, the set of blades 28 can be driven by an electric motor within the base unit.

Figure 2A:
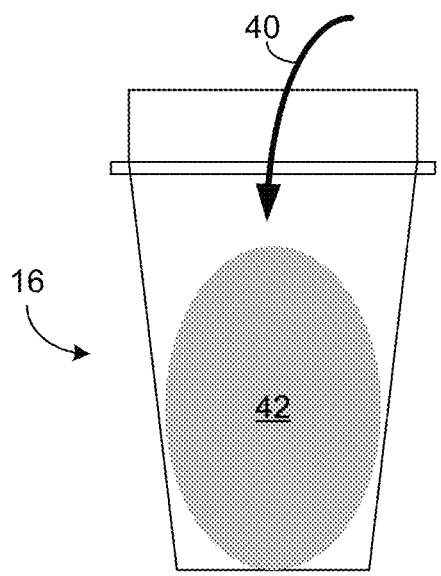
FIGS. 2A to 2F show various stages of an example blending process utilizing the blender of FIG. 1.

FIGS. 2A to 2F show various stages of an example blending process utilizing the blender 10 of FIG. 1. More particularly, FIG. 2A depicts a stage where a cup 16 is shown to be oriented (e.g., open end facing upward) to allow one or more ingredients to be introduced (depicted as arrow 40) into the cup 16 to result in a volume 42 of such ingredient(s).

Figure 2B:
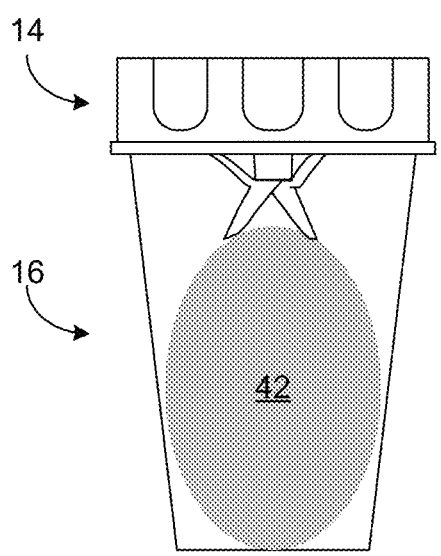

FIG. 2B depicts a stage where a blade assembly 14 is shown to be secured to the open end of the cup 16 so as to provide an enclosed volume within the cup 16 with the ingredient(s) therein.

Figure 2C:
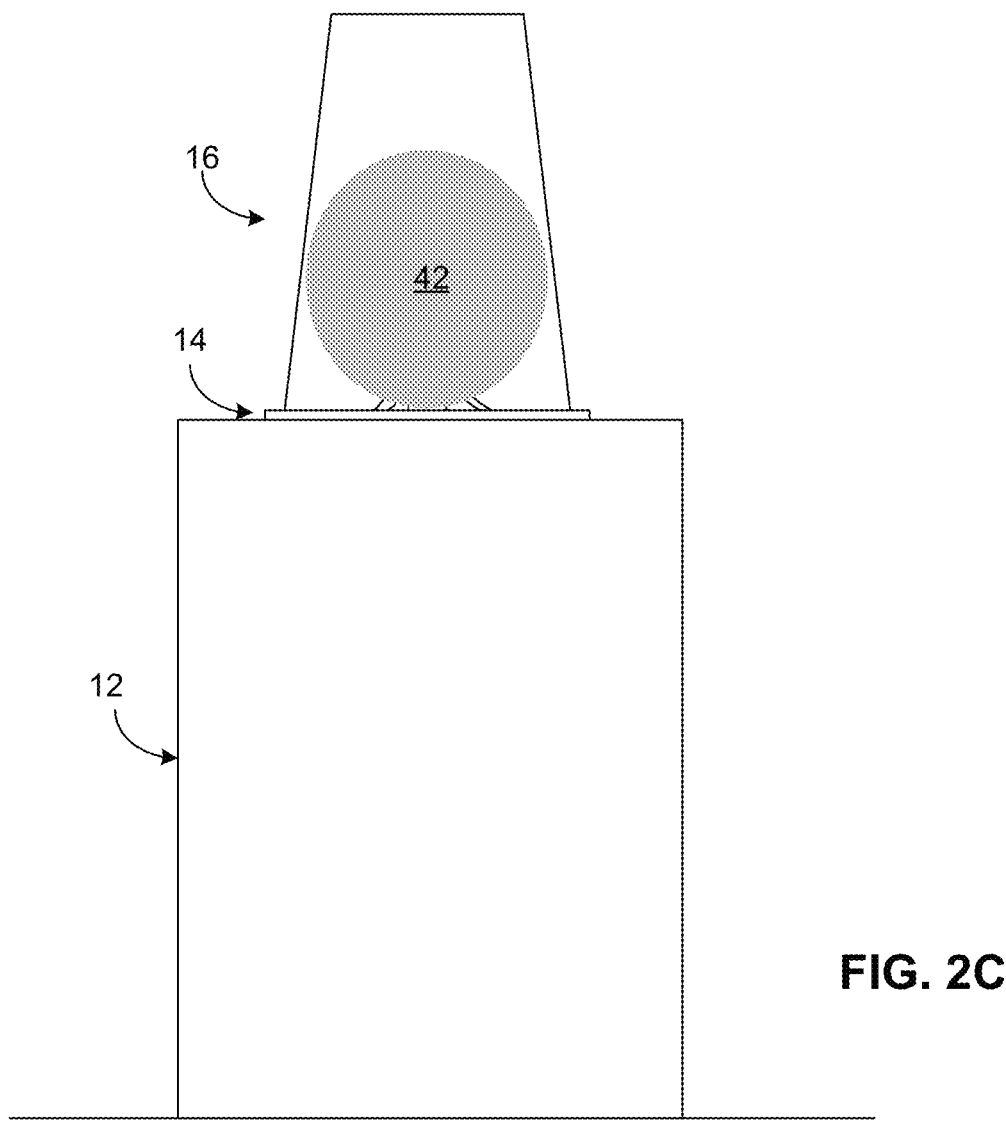

FIG. 2C depicts a stage where the assembly of FIG. 2B is shown to be inverted and positioned on a base unit 12. Due to the inverted orientation of the cup 16, some or all of the volume 42 of ingredient(s) comes in contact with a set of blades of the blade assembly, thereby allowing the volume 42 of ingredient(s) to be blended.

Figure 2D:
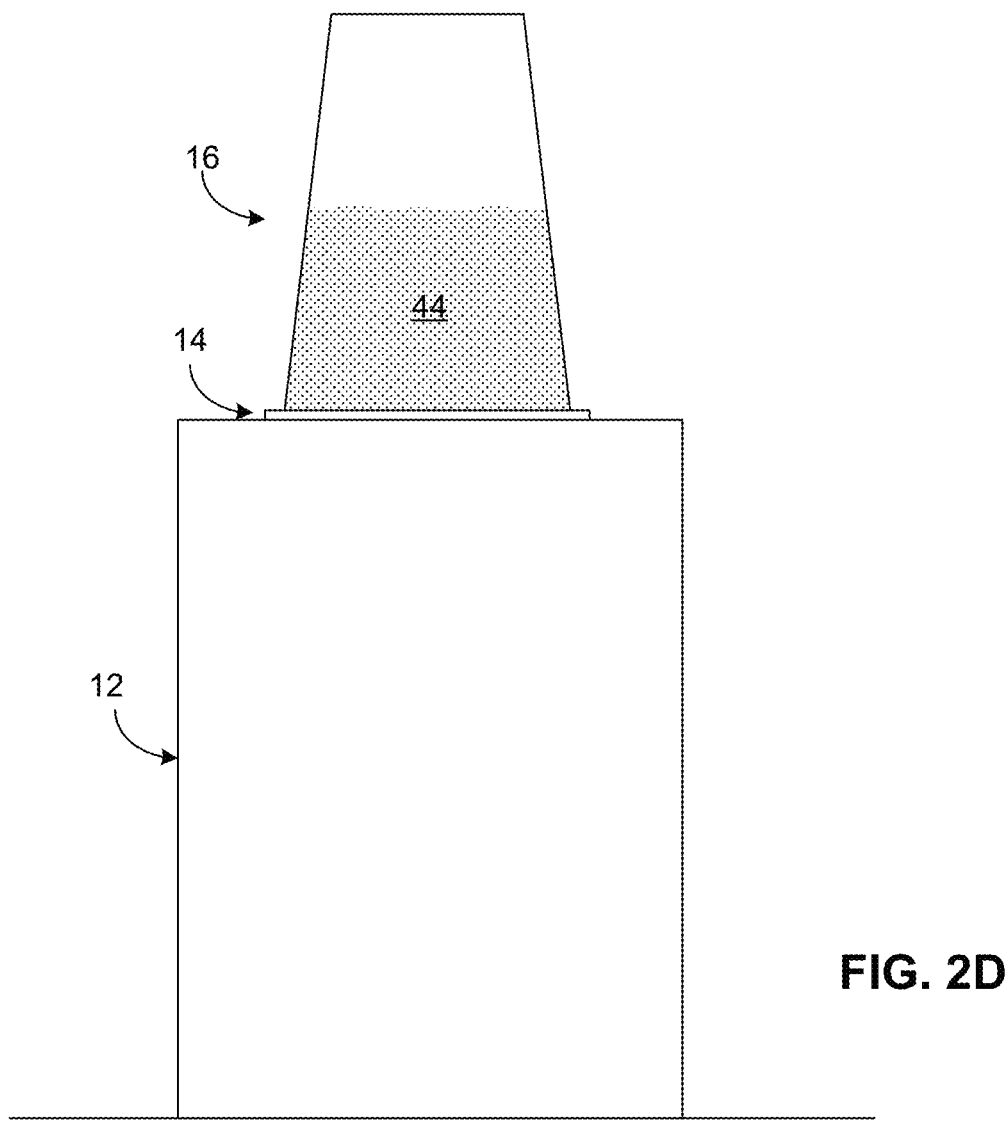

FIG. 2D depicts a stage where the volume 42 of ingredient(s) in FIG. 2C has been blended to provide a blended mixture 44.

Figure 2E:
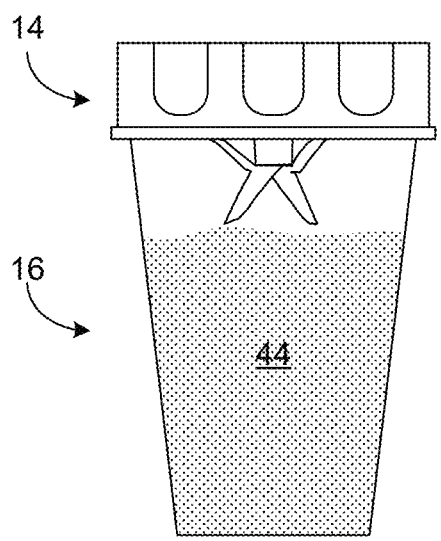

FIG. 2E depicts a stage where the cup 16 with the blade assembly 14 still attached thereon has been removed from the base unit (12 in FIG. 2D) and returned to an orientation similar to the orientation of FIG. 2A. In such an orientation, the blended mixture 44 is shown to settle on the cup's floor, and thus away from the set of blades of the blade assembly 14.

Figure 2F:
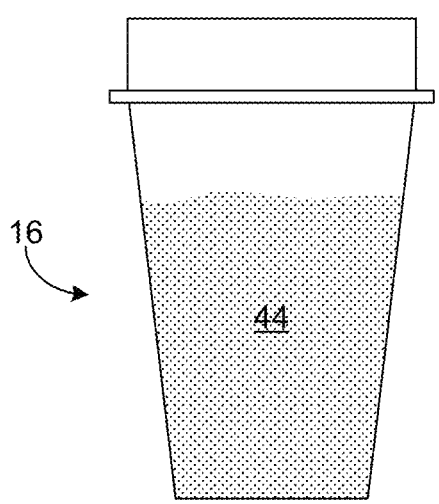

FIG. 2F depicts a stage where the blade assembly (14 in FIG. 2E) has been removed from the open end of the cup 16. At this stage, the blended mixture 44 can be consumed directly from the cup 16, be removed through the open end of the cup 16, or some combination thereof.

Figures 3A, 3B, 3C:
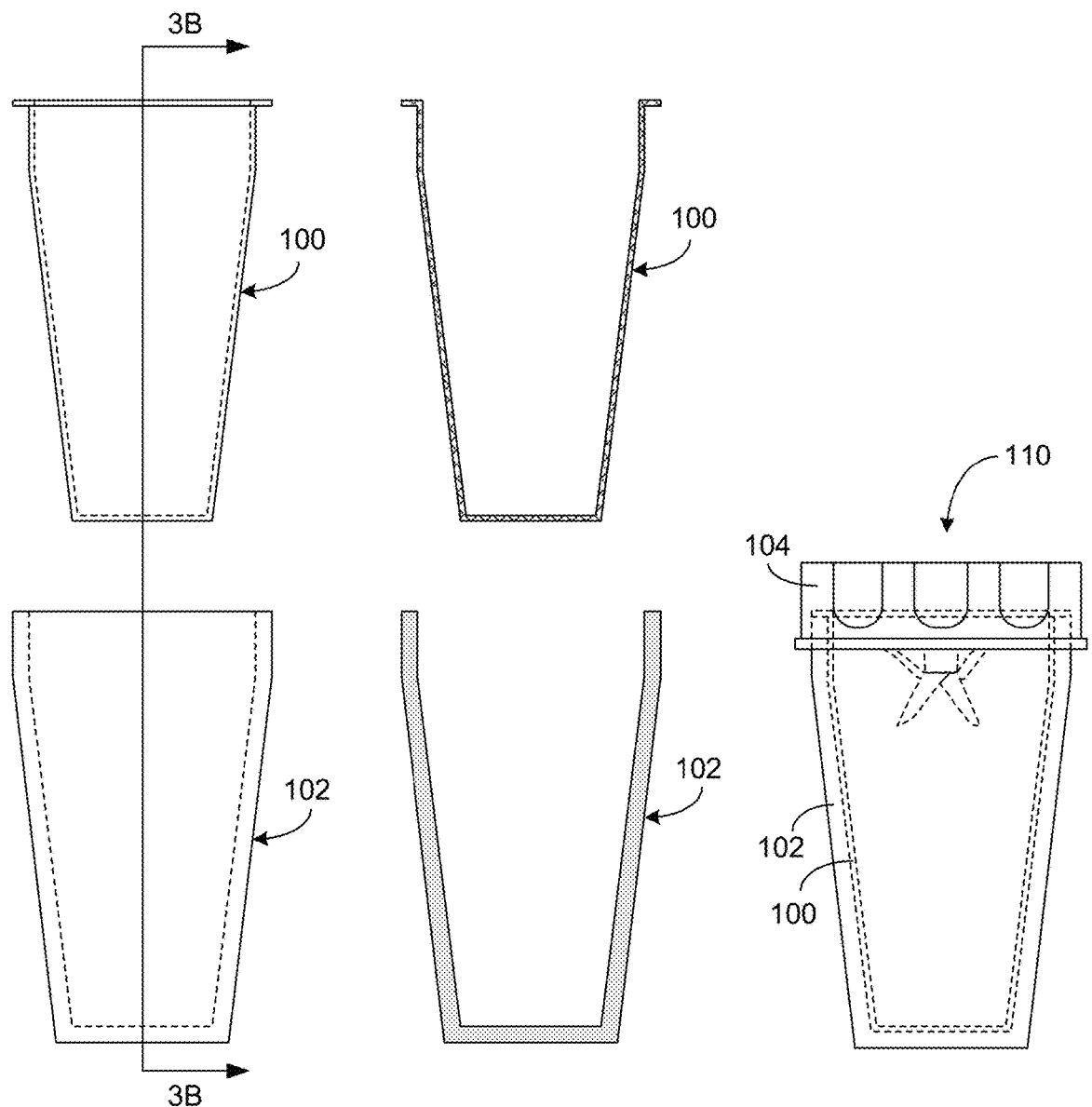
FIG. 3A shows an assembly that can be utilized with a base unit of a blender, with the assembly including a container, a liner and a blade assembly.
FIG. 3B shows a sectional view as indicated in FIG. 3A.
FIG. 3C shows an assembled view of the assembly of FIG. 3A.
Figure 4A:
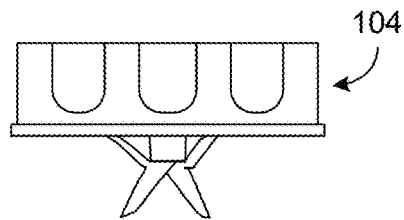
FIG. 4A shows another assembly that can be utilized with a base unit of a blender, with the assembly including a container, a liner, a coupling extender and a blade assembly.
Figure 4B:
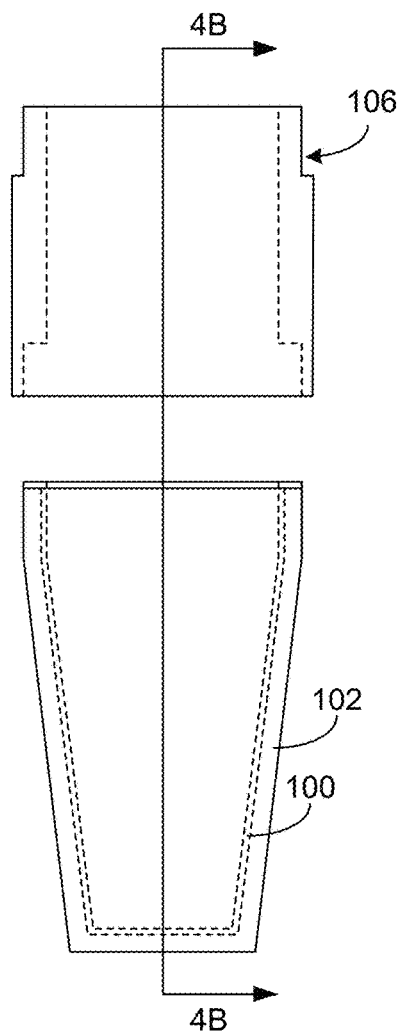
FIG. 4B shows a sectional view as indicated in FIG. 4A.
Figure 4C:
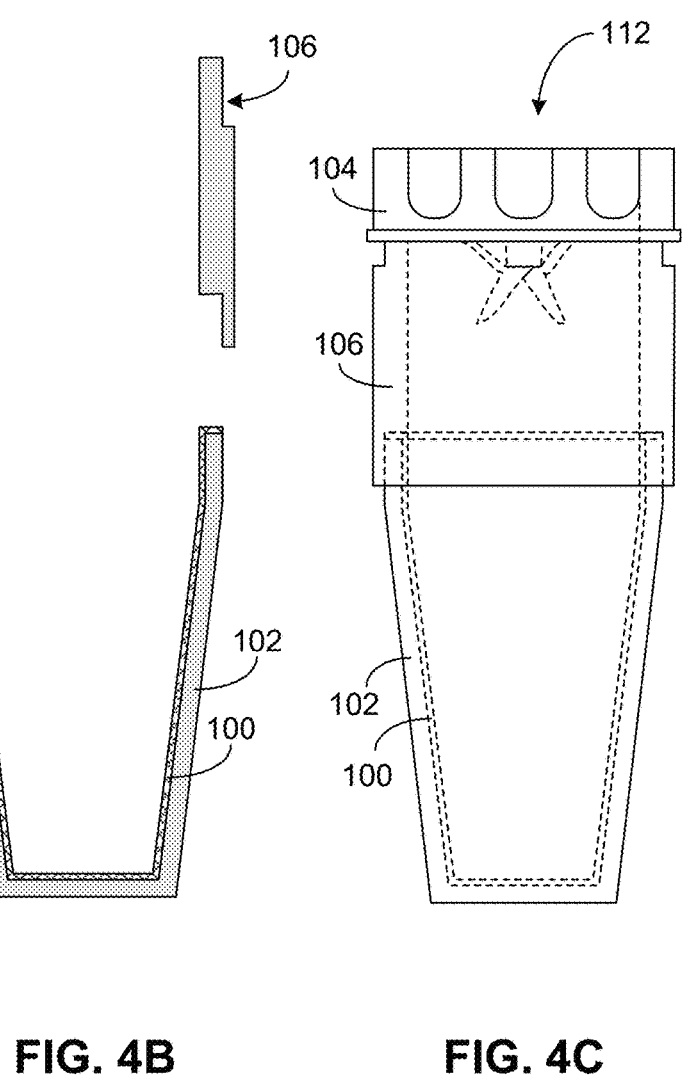
FIG. 4C shows an assembled view of the assembly of FIG. 4A.

In some implementations, the present disclosure relates to a liner that can be utilized with a container (also referred to herein as a cup) of a blender. FIGS. 3A to 3C show an example of such a liner configured to be utilized with a cup. FIGS. 4A to 4C show another example of such a liner configured to be utilized with a cup and a coupling extender.

FIG. 3A shows that in some embodiments, a liner 100 having one or more features as described herein can be configured to be inserted into a cup 102, and a blade assembly 104 can be secured to the resulting assembly of the liner 100 and the cup 102. FIG. 3B shows a side sectional view as indicated in FIG. 3A, and FIG. 3C shows an assembled view of the FIG. 3A. Examples related to the liner 100 are described herein in greater detail.

In the example of FIGS. 3A to 3C, the blade assembly 104 is shown to be attachable to the upper opening of the cup 102. FIGS. 4A to 4C show that in some embodiments, a coupling extender 106 can be implemented between a cup 102 and a blade assembly 104.

More particularly, FIG. 4A shows that a liner 100 having one or more features as described herein can be configured to be inserted into a cup 102, and a coupling extender 106 can be secured to the resulting assembly of the liner 100 and the cup 102. Then, a blade assembly 104 can be secured to the coupling extender 106 to form an enclosed volume that is now increased due to the use of the coupling extender 106. FIG. 4B shows a side sectional view as indicated in FIG. 4A, and FIG. 4C shows an assembled view 112 of the assembly of FIG. 4A. Examples related to such an assembly are described herein in greater detail.

Referring to the examples of FIGS. 3 and 4, it is noted that in some embodiments, the blade assemblies 104 of FIGS. 3 and 4 can be substantially the same, such that a given blade assembly 104 can be utilized with (FIG. 4) or without (FIG. 3) the coupling extender 106. It is also noted that in some embodiments, the blade assemblies 104 of FIGS. 3 and 4 are different, such that the blade assembly 104 associated with one configuration (e.g., FIG. 4) may not be utilized with the other configuration (e.g., FIG. 3).

Figure 5A:
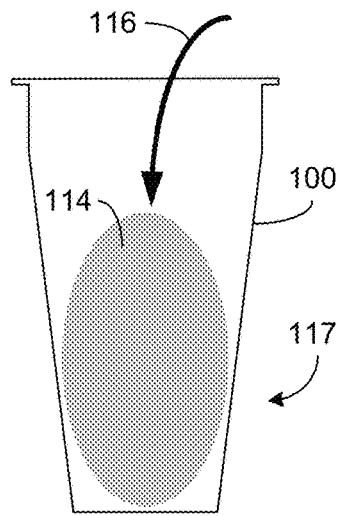
FIGS. 5A to 5J show various stages of an example blending process utilizing the assembly of FIG. 4A.

FIGS. 5A to 5J show an example of how the configuration of FIG. 4 can be utilized to perform a blending operation. In FIG. 5A, an assembly 114 of one or more ingredients to be blended is shown to be introduced (indicated as arrow 116) into a liner 100 so as to form an assembly 117.

Figure 5B:
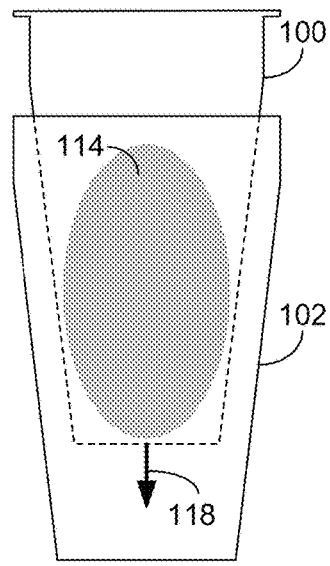
Figure 5C:
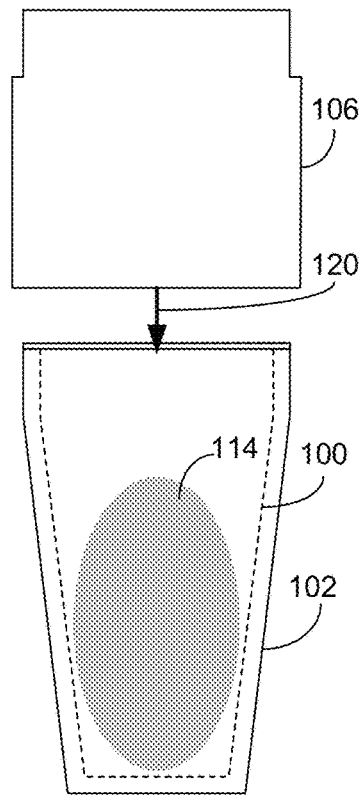

In FIG. 5B, the assembly 117 of FIG. 5A is shown to be introduced (indicate as arrow 118) to a cup 102 dimensioned to receive the liner 100. In FIG. 5C, a coupling extender 106 is shown to be provided over the cup/liner assembly of FIG. 5B, as indicated by arrow 120.

Figure 5D:
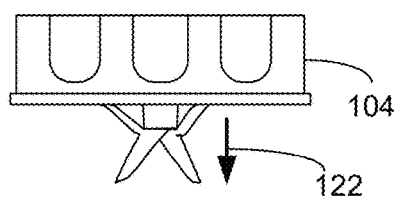
Figure 5D:
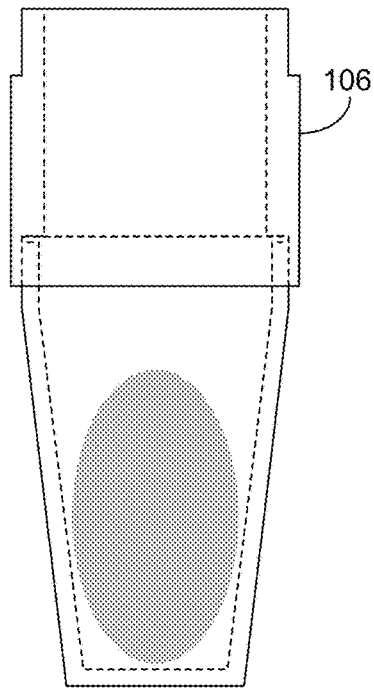
Figure 5E:
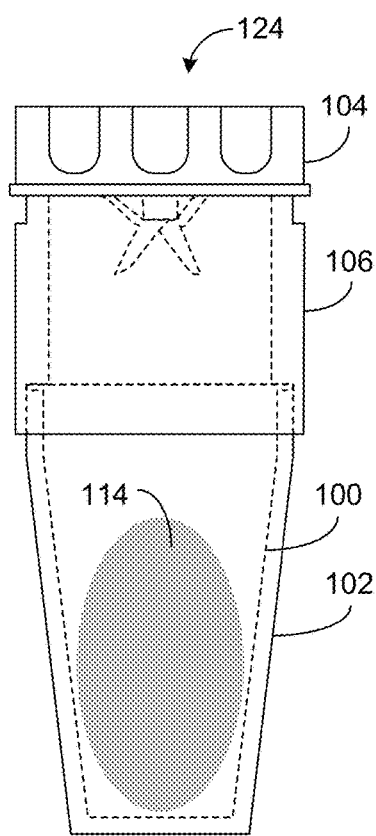

In FIG. 5D, a blade assembly 104 is shown to be introduced over the coupling extender 106, as indicated by arrow 122. In FIG. 5E, the blade assembly 104 is shown to be secured onto the coupling extender so as to provide an assembly 124. At this stage, the assembly 124 may be inverted to allow the one or more ingredients 114 to be introduced to a blade of the blade assembly (104 in FIG. 5E).

Figure 5F:
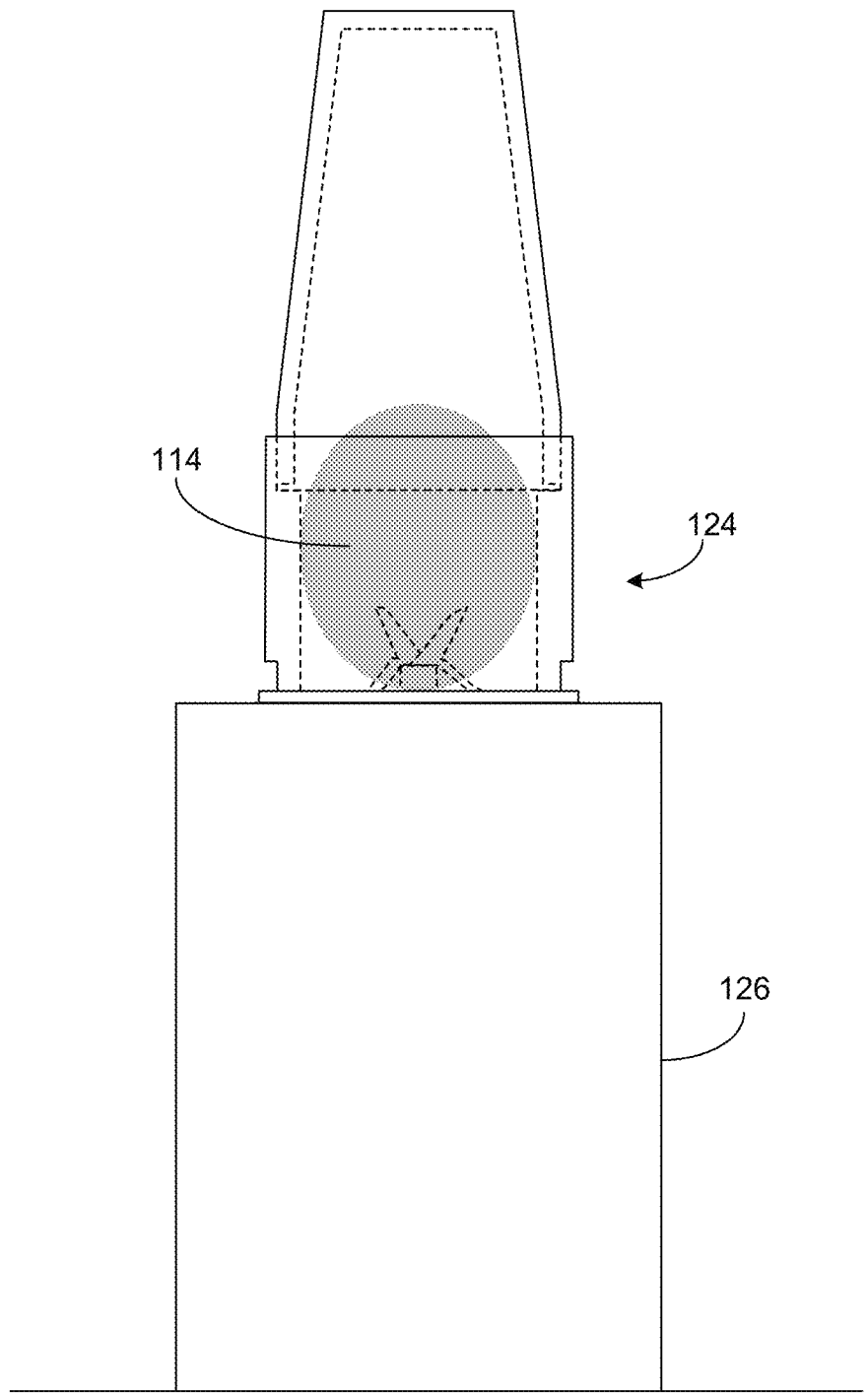

In FIG. 5F, the assembly 124 of FIG. 5E, now inverted, is shown to be mounted onto a motor base 126. In such an inverted orientation, the blade of the blade assembly can be driven by the motor base 126 and engage the one or more ingredients 114 to perform a blending operation.

Figure 5G:
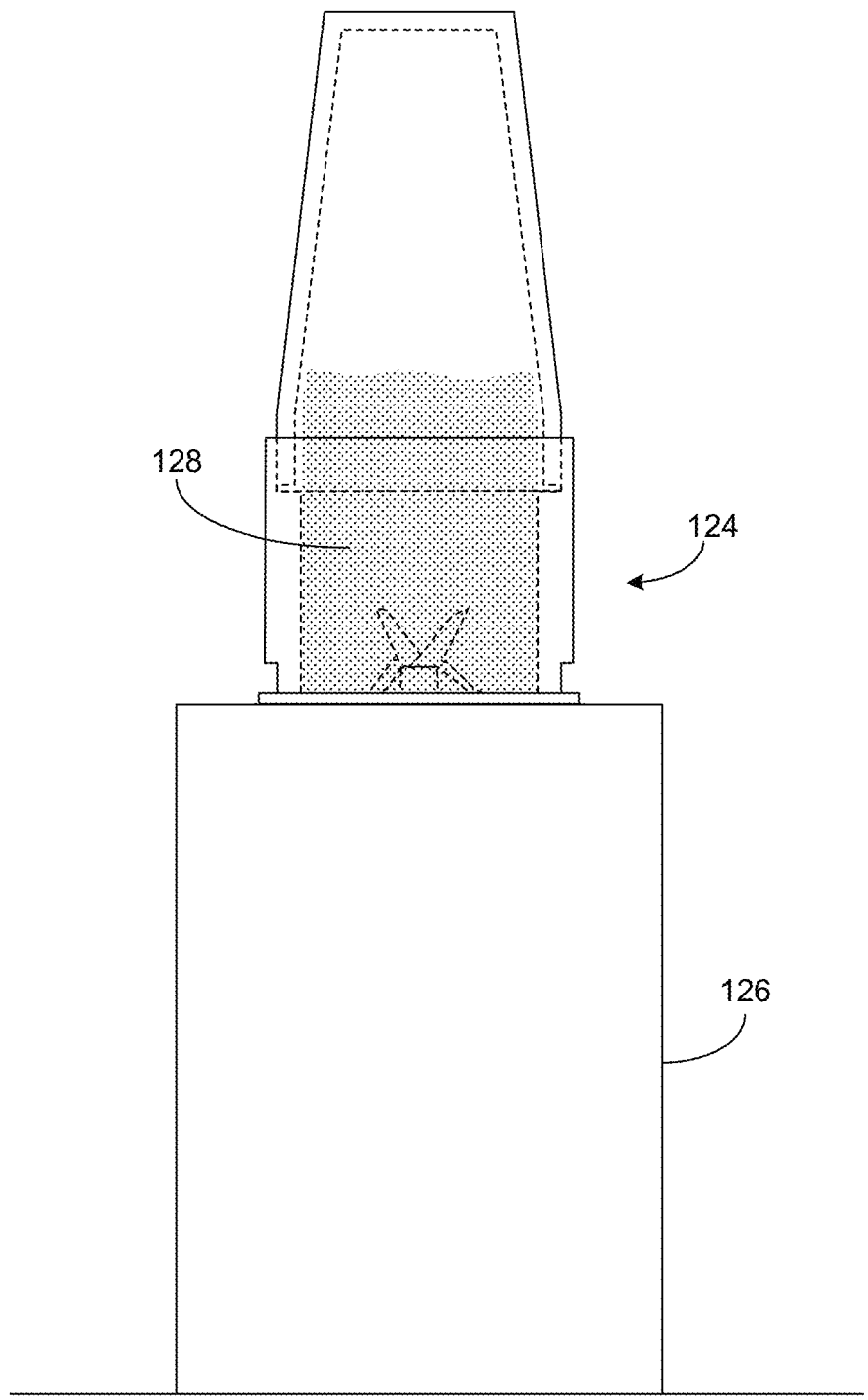

FIG. 5G shows a stage where the blending operation of FIG. 5E has been performed to yield a blended mixture 128. The assembly 124 with the blended mixture 128 contained therein can then be removed from the motor base 126.

Figures 5H, 5I:
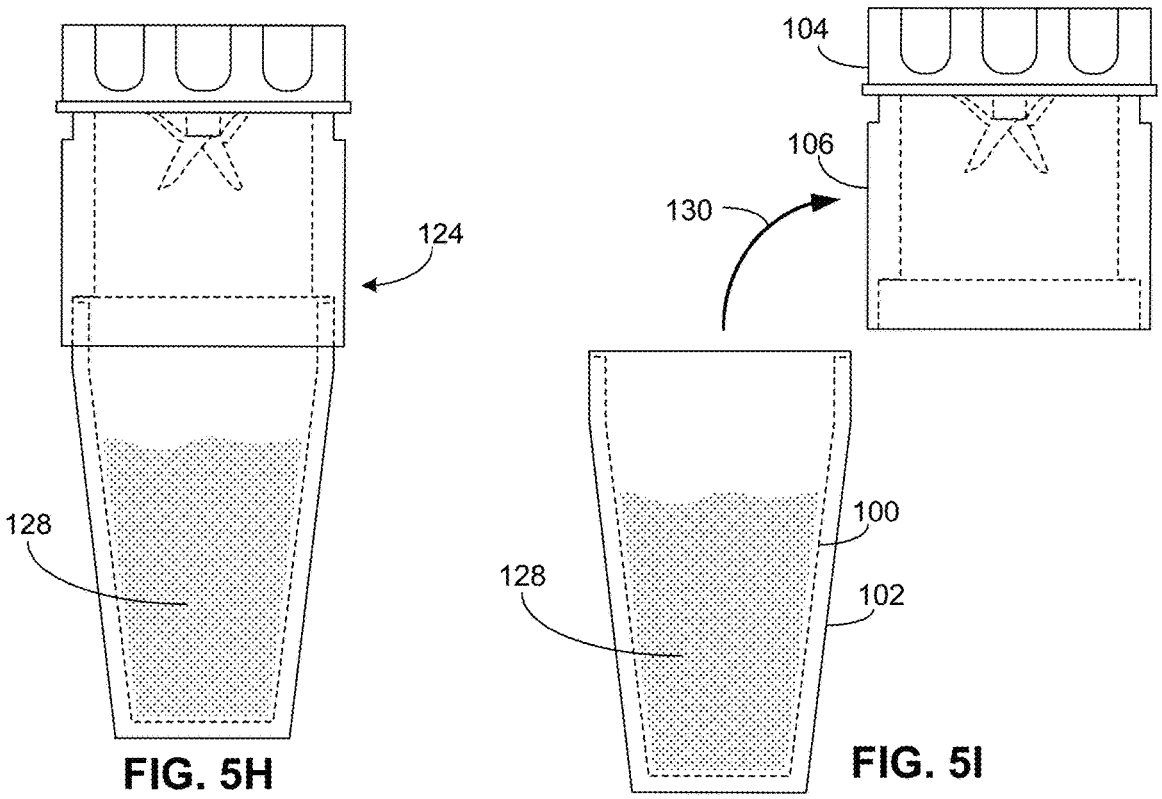

FIG. 5H shows the assembly 124 removed from the motor base 126 and in an upright orientation of the liner/cup (100/102 in FIG. 5E) assembly. In such an orientation, the blended mixture 128 is shown to generally settle within the liner 100.

In FIG. 5I, the coupling extender 106 with the blade assembly 104 attached thereto is shown to be removed (arrow 130) from the liner/cup (100/102) assembly.

Figure 5J:
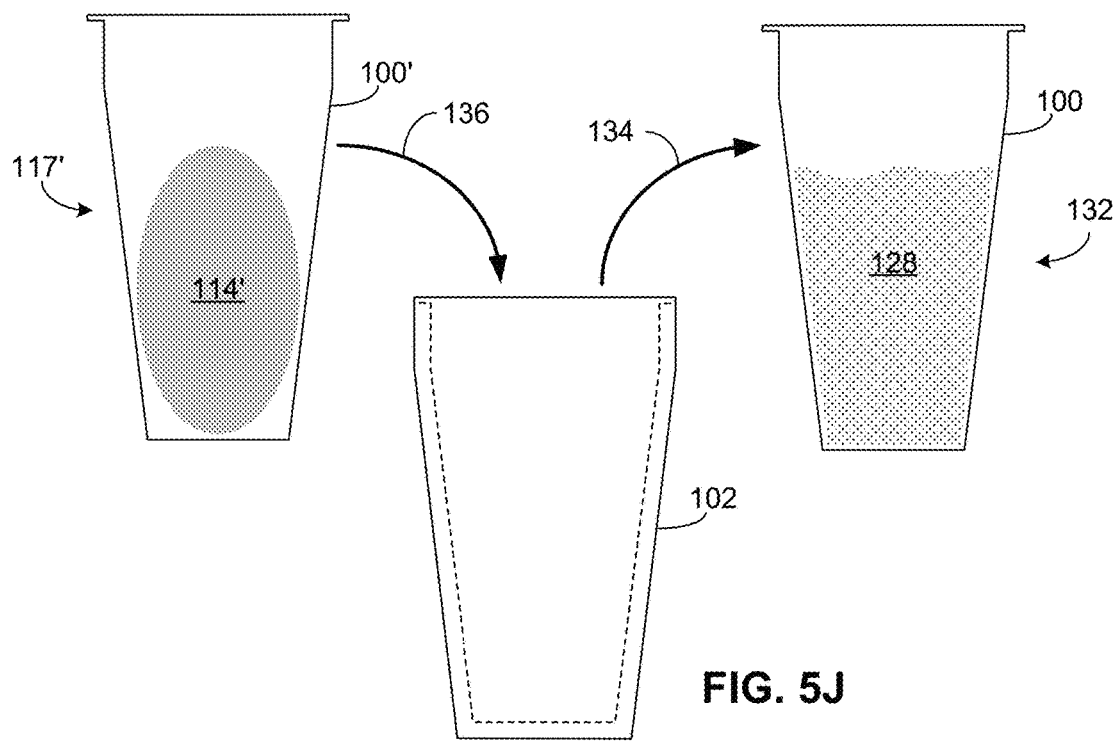

In FIG. 5J, an assembly 132 of the liner 100 with the blended mixture 128 therein is shown to be removed (arrow 134) from the cup 102. It will be understood that the blended mixture 128 can then be consumed directly from the liner 100, be transferred to a separate container for consumption, or some combination thereof.

FIG. 5J further shows an assembly 117' that includes one or more ingredients 114' within a liner 100', similar to the assembly 117 of FIG. 5A. Such an assembly (117') can be introduced into the cup 102 for a blending operation as described herein.

In some embodiments, the liner 100' of FIG. 5J may be the same liner 100 that was removed from the cup 102 (with the blended mixture 128 consumed/removed), or a different liner. In the latter case, one can see that use of liners having one or more features as described herein provides improved utility of a blender including, for example, increase in throughput of blending operations and reduced likelihood of cross-contamination associated with the cup 102.

In the various examples described herein in reference to FIGS. 5A to 5J, a coupling extender 106 is utilized. It will be understood that such a coupling extender may or may not be utilized with a liner 102 having one or more features as described herein. For example, the step depicted in FIG. 5C may be omitted, and in FIGS. 5D to 5I, the coupling extender 106 may be omitted such that the blade assembly 104 engages the cup/liner assembly without any extender.

Figure 6:
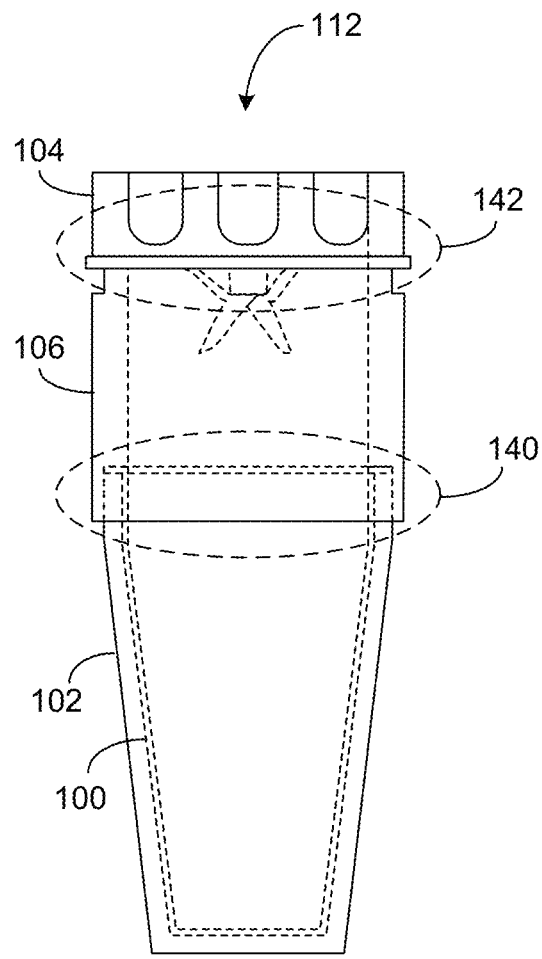
FIG. 6 shows that in some embodiments, an assembly such as the assembly of FIG. 3A or FIG. 4A can be configured to provide one or more mechanical couplings among the parts.

FIG. 6 shows an assembly 112 similar to the assembly 112 of FIG. 4C. FIG. 6 also shows that in some embodiments, a coupling mechanism 140 can be provided between a coupling extender 106 and a cup/liner (102/100) assembly, and a coupling mechanism 142 can be provided between a blade assembly 104 and the coupling extender 106.

In some embodiments, the coupling mechanisms 140 and 142 may or may not be similar. In the former case where the coupling mechanisms 140 and 142 are similar, the blade assembly 104 can be coupled to the cup/liner (102/100) assembly through the coupling extender 106 as shown, or be coupled directly to the cup/liner (102/100) assembly without a coupling extender.

Figure 7:
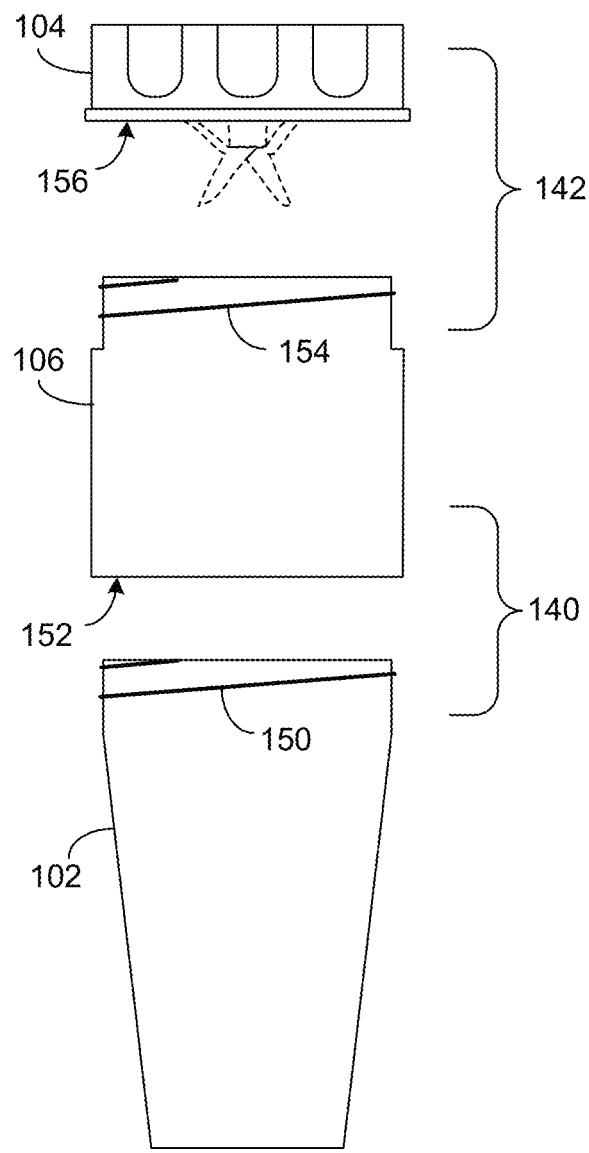
FIG. 7 shows examples of mechanical couplings that can be implemented for the configuration of FIG. 6.

FIG. 7 shows that in some embodiments, threaded coupling mechanism can be provided for each of the coupling mechanisms 140 and 142 of FIG. 6. For example, the coupling mechanism 140 between the coupling extender 106 and the cup/liner (102/100) assembly can include a thread feature 150 implemented on the outer surface of the upper portion of the cup 102, and a matching thread feature 152 implemented on the inner surface of the lower portion of the coupling extender 106. In another example, the coupling mechanism 142 between the blade assembly 104 and the coupling extender 106 can include a thread feature 154 implemented on the outer surface of the upper portion of the coupling extender 106, and a matching thread feature 156 implemented on the inner surface of the blade assembly 104. For the purpose of description of FIG. 7, it will be understood that upper and lower portions are in the context of the example orientation of the assembly of parts as depicted in FIG. 7.

Referring to the example of FIG. 7, it is noted that if the thread features 150/152 are similar to the thread features 154/156, the coupling extender 106 may or may not be utilized for blending operations as described herein.

It will be understood that either or both of the coupling mechanisms 140 and 142 can be configured in other manners. For example, coupling mechanisms such as bayonet mechanism, friction mechanism, etc., may be utilized.

In the various examples shown in FIGS. 3 to 7, the outer shape of a liner 100 is depicted as having the inner shape of a corresponding cup 102, such that when the liner 100 is inserted into the cup 102, the liner 100 fits substantially flush within the cup 102. It is noted that if the outer shape of the liner 100 and the inner shape of the cup 102 have smooth surfaces, it may be difficult for air to move between the liner 100 and the cup 102 when the liner 100 is being inserted into and/or removed from the cup 102. For example, air may become trapped between the liner 100 and the cup 102, thereby resulting in the liner 100 not being fully seated within the cup 102. In another example, when the liner 100 is being removed from the cup 102, a seal may have formed therebetween, thereby resulting in the liner 100 being difficult to remove. It is noted that liquid such as water can provide issues similar to air.

Accordingly, it will be understood that for the purpose of description, a fluid can include a gas such as air, a liquid such as water, or any combination thereof.

Figure 8:
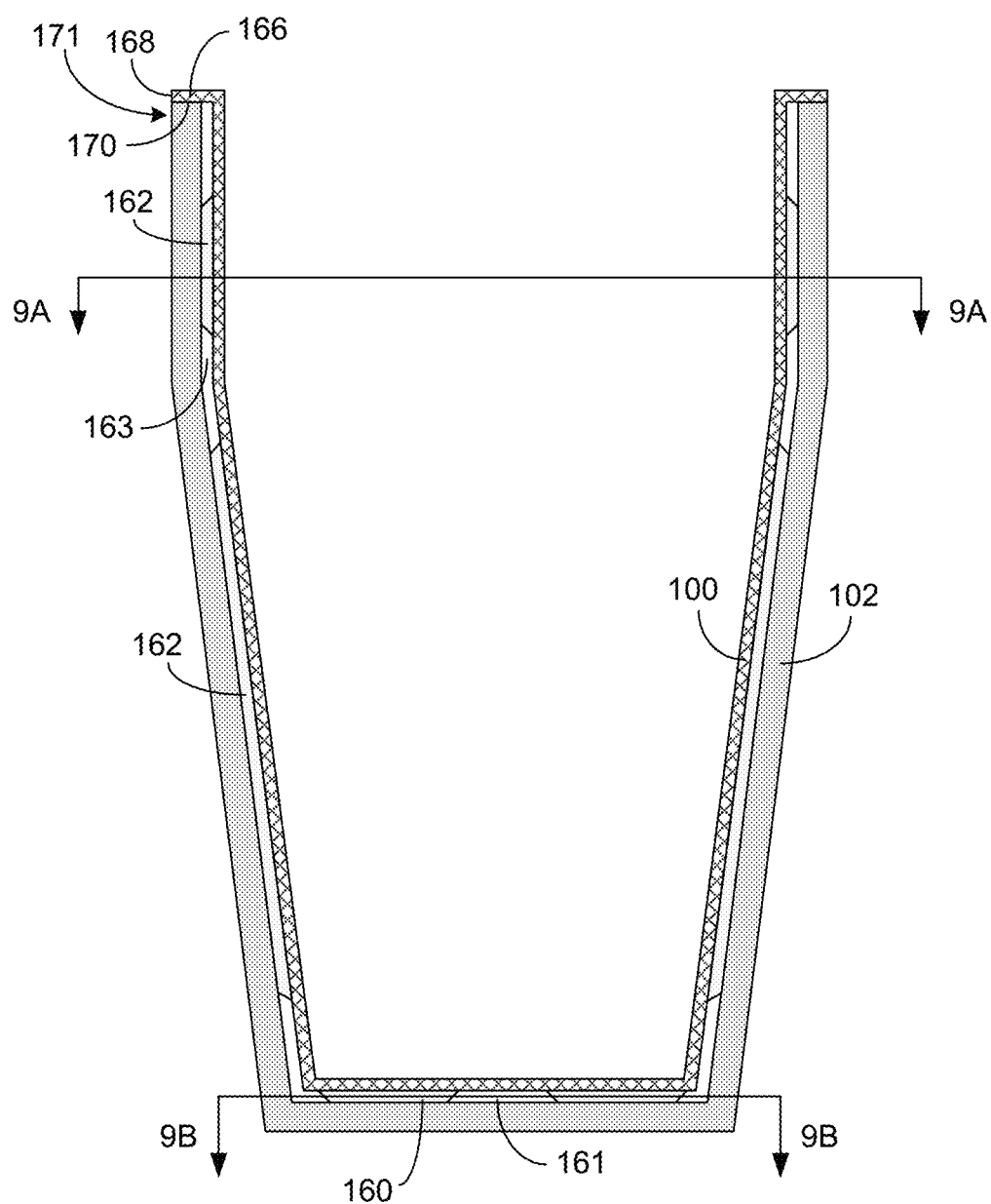
FIG. 8 shows an example where either or both of the container and the respective liner of FIG. 3A or FIG. 4A can be configured to allow the liner to be used with the container in a desirable manner.

FIG. 8 shows that in some embodiments, either or both of a liner and a corresponding cup can include one or more features that allow improved movement of a fluid between the liner and the cup. Accordingly, such feature(s) can allow the liner to be inserted into and removed from the cup in an easier manner.

Figure 9A:
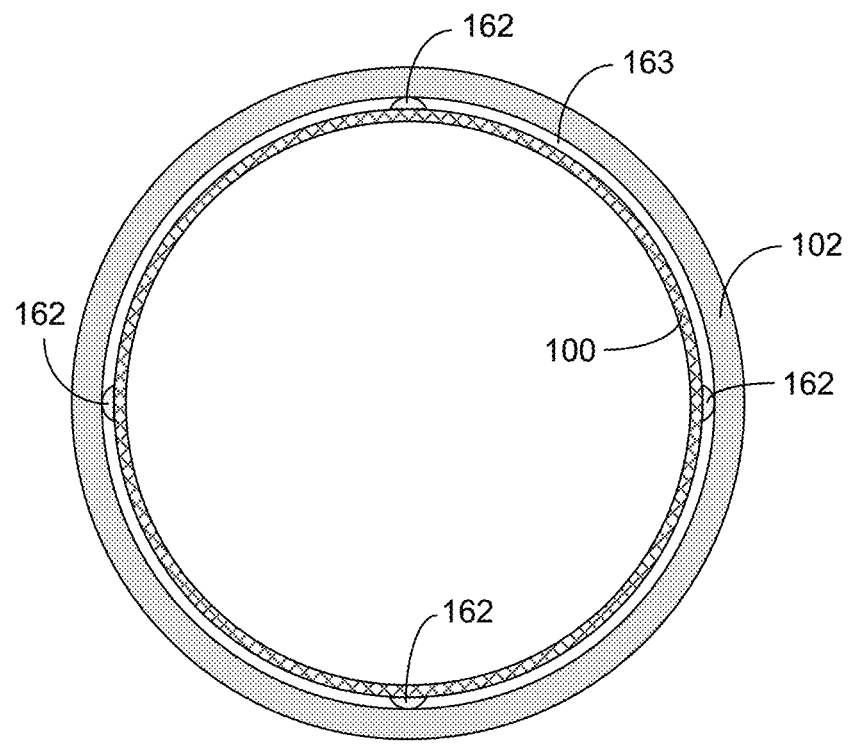
FIG. 9A shows a sectional view as indicated in FIG. 8.
Figure 9B:
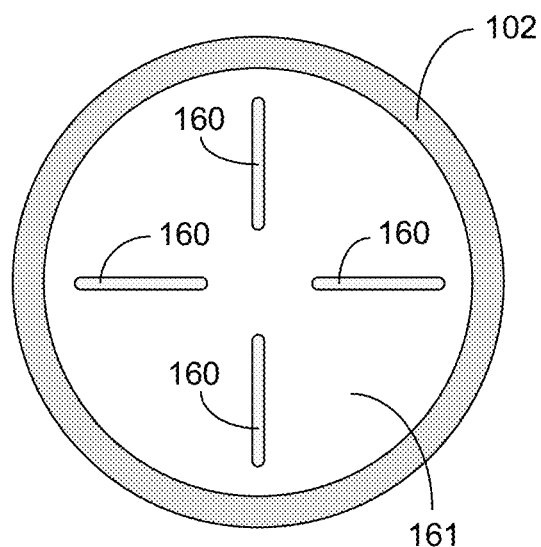
FIG. 9B shows a sectional view as indicated in FIG. 8.

FIG. 8 shows a side sectional view of an assembly where a liner 100 is inserted into a cup 102. FIGS. 9A and 9B show sectional views indicated in FIG. 8.

Referring to FIGS. 8 and 9, in some embodiments, the example liner 100 is shown to include a plurality of features 162 formed on the outer surface of a side wall of the liner 100, and a plurality of features 160 formed on the outer surface of a bottom portion of the liner 100. The liner 100 and the features 162, 160 are shown to be dimensioned to allow the liner 100 to be seated within the cup 102 so as to provide a space 163 between outer surface of the side wall of the liner 100 and the inner surface of a side wall of the cup 102, and to provide a space 161 between outer surface of the bottom portion of the liner 100 and the inner surface of a bottom portion of the cup 102. Such spaces (163, 161) can allow the liner 100 to be inserted into and removed from the cup 102 in an easier manner without, or with a reduced likelihood of, fluid-related resistance.

Referring to the specific examples of the features 162, 160 in FIGS. 9A and 9B, four of such features are shown to be implemented along the circumferential direction relative to a longitudinal axis of the liner/cup assembly. It will be understood that different numbers of such features may also be implemented. It is also noted that in the side sectional view of FIG. 8, one side of the liner 100 is shown to include separate features 162 along the upper portion and the lower portion. It will be understood that such a group of feature(s) may include more or less number of features.

It is also noted that in the examples of FIGS. 8 and 9, the features 162, 160 are depicted as being relatively small in the circumferential direction, when compared to the spaces 163, 161 therebetween. It will be understood that the features 162, 160 can also be implemented to be larger in the circumferential direction such that the spaces 163, 161 therebetween are smaller.

In some embodiments, some or all of the features 162, 160 associated with the liner 100 can be formed as integral parts of the liner 100 utilizing, for example, and appropriate molding process.

In the examples of FIGS. 8 and 9, it is assumed that the features 162, 160 are parts of the liner 100. In such an embodiment, the corresponding cup can be an existing cup without modification having, for example a smooth inner surface.

It will be understood that in some embodiments, one or more features can also be implemented on an inner surface of the cup to allow the liner 100 to be inserted into and removed from the cup 102 in an easier manner without, or with a reduced likelihood of, fluid-related resistance. In such an embodiment, the corresponding liner can be implemented with or without features on its outer surface.

FIG. 8 also shows that in some embodiments, a liner 100 having one or more features as described herein can include a lip 168 along its upper perimeter configured to engage a surface 170 of the upper perimeter of the cup 102. Accordingly, when the liner 100 is seated within the cup 102, the lip 168 can provide an engaging surface 166 to, for example, allow formation of a seal when a blade assembly (e.g., 104 in FIG. 7) is secured onto the liner/cup assembly as described herein.

In some embodiments, the lip 168 of the liner 100 can be dimensioned to provide the foregoing sealing functionality, and to allow the liner 100 to be removed from the cup 102 in an easier manner. For example, to remove the liner 100 from the cup 102, a portion of the lip 168 can be pushed inward to separate that portion of the liner 100 from the cup 102 to facilitate the removal.

In some embodiments, the lip 168 of the liner 100 can be dimensioned to provide some or all of the foregoing functionalities, and also provide a side profile 171 that does not interfere with mechanical coupling of the liner/cup assembly with either of a coupling extender (e.g., 106 in FIG. 7) and a blade assembly 104. For example, the lateral extension of the lip 168 can be selected such that the outward lateral end of the lip does not protrude beyond the outer surface of the upper portion of the cup 102 and interfere with the mechanical coupling operation.

Figure 10A:
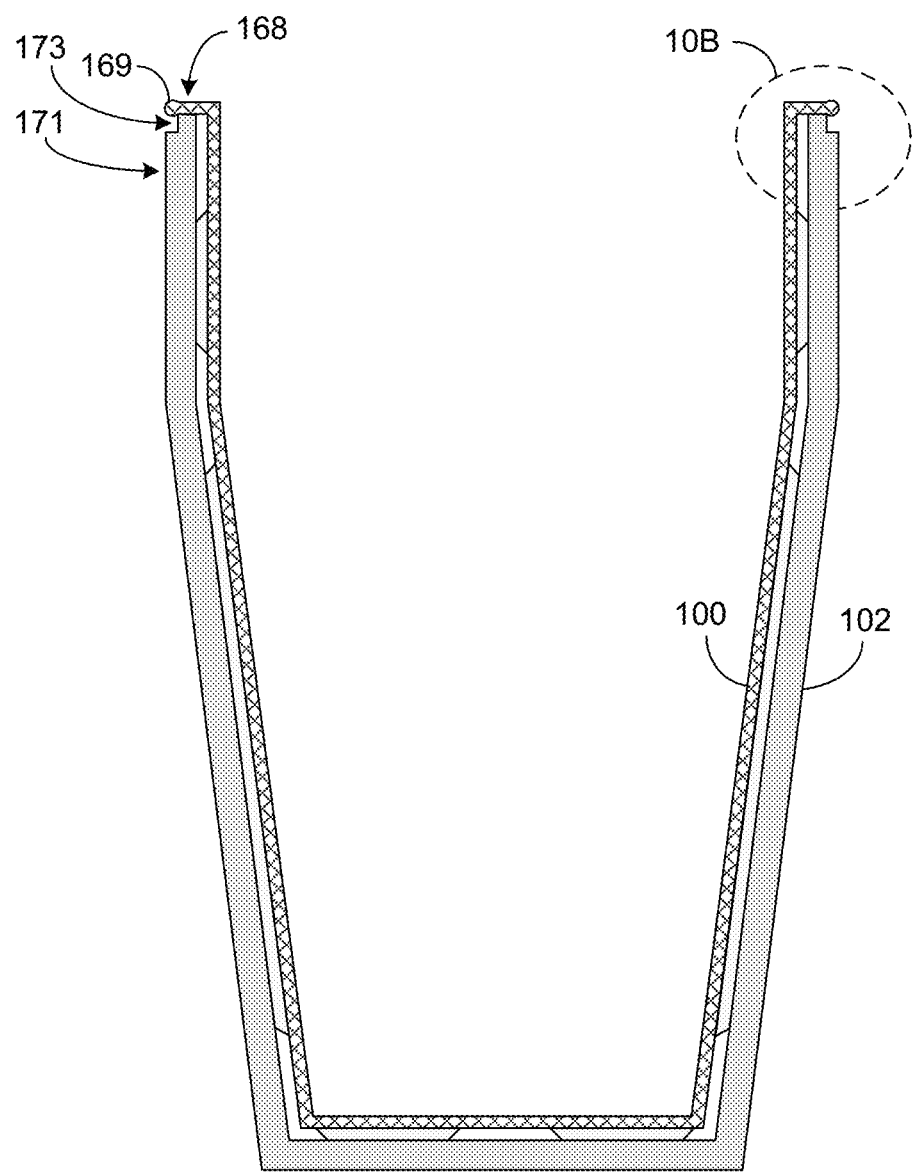
FIGS. 10A and 10B show another example where either or both of the container and the respective liner of FIG. 3A or FIG. 4A can be configured to allow the liner to be used with the container in a desirable manner.
Figure 10B:
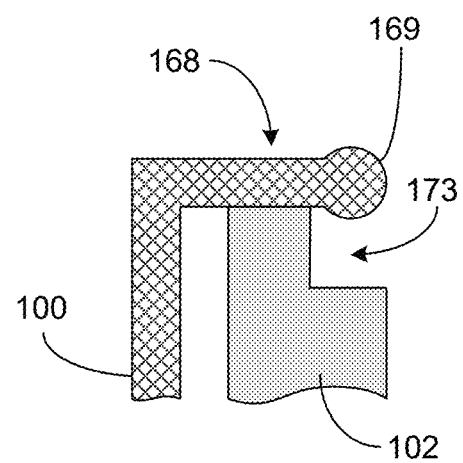

FIGS. 10A and 10B show that in some embodiments, a lip 168 of a liner 100 can include a feature 169 such as a bead implemented at an outer lateral end of the lip 168. Such a feature (169) can be dimensioned to prevent inward lateral motion of the lip 168 unless the feature 169 is actuated by a user to remove the liner 100 from the cup 102.

For example, and referring to the enlarged view of FIG. 10B, the bead 169 is shown to be positioned beyond an outer edge of the upper portion of the cup 102. In such a position of the bead 169, the lip 168 is generally inhibited from moving laterally inward relative to the upper portion of the cup 102. However, if the bead 169 is pushed slightly upward and laterally inward, the bead 169 can clear the outer edge of the upper portion of the cup 102, thereby allowing the liner 100 to be grasped easier for removal from the cup 102.

FIGS. 10A and 10B show that in some embodiments, an outer upper portion of the cup 102 can be configured to accommodate a lip-end feature 169 such as the foregoing bead structure while providing a desired side profile of the liner/cup assembly. For example, and similar to FIG. 8, it is desired to provide a side profile 171 that does not interfere with mechanical coupling of the liner/cup assembly with either of a coupling extender (e.g., 106 in FIG. 7) and a blade assembly 104. In some embodiments, such a side profile can be implemented to include a recess 173 dimensioned to accommodate a portion of the bead 169. Such a recess can be dimensioned to include the above-described outer edge of the upper portion of the cup 102 for retaining the bead 169 and such that the bead 169 does not extend outward laterally to interfere with the mechanical coupling.

In the various examples described herein (e.g., FIGS. 3-6 and 8-10), a liner 100 is depicted as having an outer surface with a side profile that is generally similar to a side profile of an inner surface of a corresponding cup 102, with or without a space (e.g., space 163 and/or 161 in FIG. 8).

Figure 11:
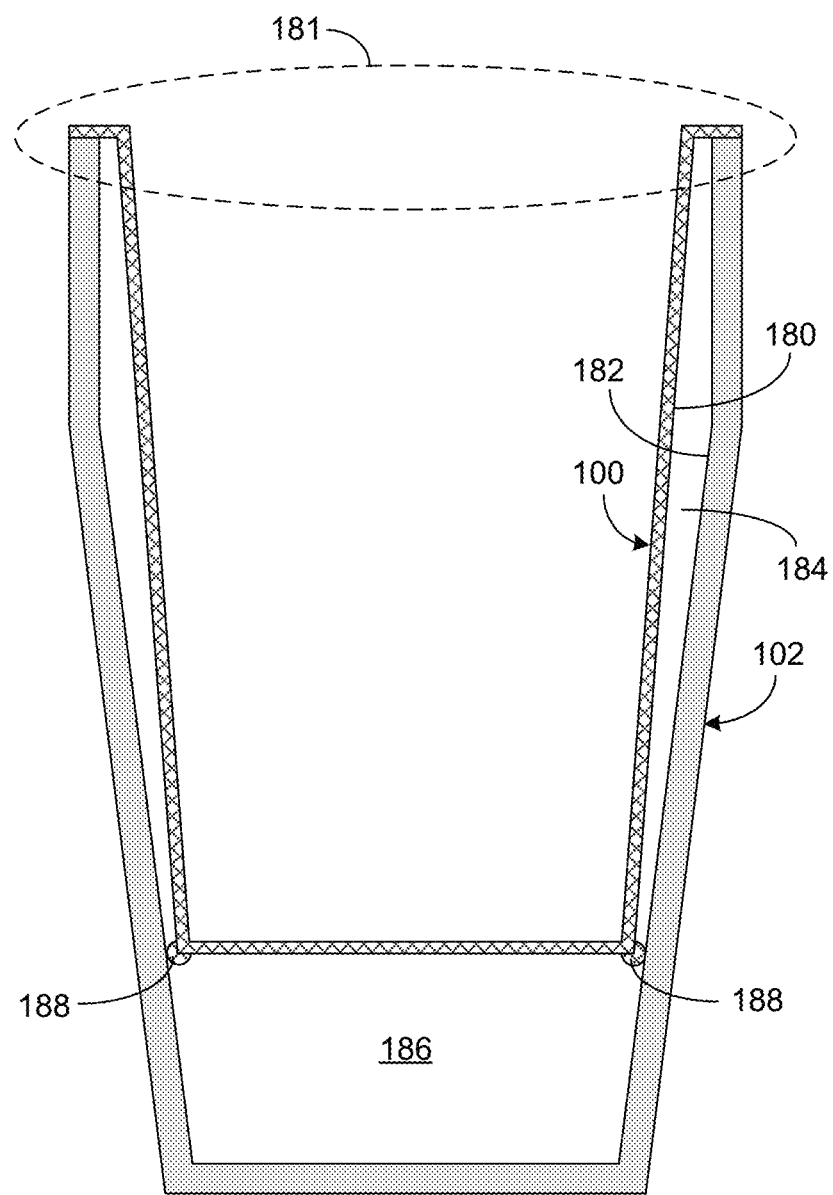
FIG. 11 shows that in some embodiments, a liner can include a side profile that is significantly different than a side profile of a corresponding cup.

FIG. 11 shows that in some embodiments, a liner 100 having one or more features as described herein does not necessarily need to have a similar profile as that of a corresponding cup 102. For example, the liner 100 in FIG. 11 is shown to include an outer surface 180 with a side profile that is significantly different than a side profile of an inner surface 182 of the cup 102. Accordingly, in the example configuration of FIG. 11, a space 184 is shown to be provided between the walls of the liner 100 and the cup 102, and a space 186 is shown to be provided between the floors of the liner 100 and the cup 102.

FIG. 11 further shows that in some embodiments, the liner 100 can be configured to provide an upper engagement (indicated as 181) with the cup 102, similar to one or more of the examples provided herein.

In the example of FIG. 11, the lower outer portion of the liner 100 is shown to include a plurality of features 188 configured to engage the inner surface of the cup 102 and thereby provide one or more spaces between the liner 100 and the cup 102, similar to the spaces 163, 161 of FIGS. 8 and 9. As described herein, such space(s) can allow the liner 100 to be inserted into and removed from the cup 102 in an easier manner without, or with a reduced likelihood of, fluid-related resistance.

In some embodiments, a kit can include a liner having one or more features as described herein. Such a kit can include a printed instruction for using the liner. For the purpose of description, it will be understood that such a printed instruction can include, for example, one or more steps printed on printable media such as paper, and/or a uniform resource locator (URL) information included with the kit (e.g., on the packaging, on a card, etc.).

In some embodiments, the above-referenced kit can further include a cup compatible for use with the liner.

In some embodiments, the above-reference kit can further include a coupling extender compatible for use with the liner; and such a kit may or may not include a cup.

In some embodiments, the above-reference kit can further include a cup compatible for use with the liner, a corresponding blade assembly, and a corresponding motor base.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A liner for a blender, the liner comprising a body dimensioned to fit within a cup for the blender, the body defining an inner volume and including an opening with a perimeter having a lip dimensioned to engage a perimeter of an opening of the cup, such that when the liner is positioned within the cup, the resulting assembly is capable of being mechanically coupled with a blade assembly and provide a seal for the inner volume for a blending operation by the blender, wherein the lip includes a bead structure configured to retain the perimeter of the liner relative to the perimeter of the cup when the liner is positioned within the cup.

2. The liner of claim 1, wherein the body includes a closed end and an open end opposite from the closed end, the open end having the opening with the perimeter.

3. The liner of claim 1, wherein the lip of the liner is configured such that the blade assembly, when mechanically coupled to the assembly of the liner positioned within the cup, provides the seal for the inner volume during the blending operation.

4. The liner of claim 1, wherein the body of the liner includes an inner surface and an outer surface such that the inner surface defines the inner volume and the outer surface faces an inner surface of the cup.

5. The liner of claim 4, wherein the outer surface of the liner has a shape that is different than a shape of the inner surface of the cup.

6. The liner of claim 4, wherein the outer surface of the liner has a shape substantially similar to a shape of the inner surface of the cup.

7. The liner of claim 6, wherein the outer surface of the liner has a shape selected to provide a substantial contact with the inner surface of the cup when the liner is positioned within the cup.

8. The liner of claim 6, wherein the outer surface of the liner has a shape selected to provide a space between the liner and the inner surface of the cup when the liner is positioned within the cup.

9. The liner of claim 8, wherein the outer surface of the liner includes one or more shapes that engage the inner surface of the cup to provide the space between the liner and the inner surface of the cup when the liner is positioned within the cup.

10. The liner of claim 9, wherein each of the one or more shapes of the outer surface of the liner is dimensioned to reduce resistance of motion associated with trapped air when the liner is being inserted into or removed from the cup.

11. A kit comprising:
a liner for a blender, the liner including a body dimensioned to fit within a cup for the blender, the body defining an inner volume and including an opening with a perimeter having a lip dimensioned to engage a perimeter of an opening of the cup, such that when the liner is positioned within the cup, the resulting assembly is capable of being mechanically coupled with a blade assembly and provide a seal for the inner volume for a blending operation by the blender, wherein the lip includes a bead structure configured to retain the perimeter of the liner relative to the perimeter of the cup when the liner is positioned within the cup; and
a printed instruction configured to facilitate use of the liner.

12. The kit of claim 11, further comprising the cup.

13. The kit of claim 12, wherein the perimeter of the cup includes a recess dimensioned to accommodate the bead structure of the lip.

14. The kit of claim 12, wherein the body of the liner includes an inner surface and an outer surface such that the inner surface defines the inner volume and the outer surface faces an inner surface of the cup, the outer surface of the liner having a shape substantially similar to a shape of the inner surface of the cup.

15. The kit of claim 14, wherein either or both of the outer surface of the liner and the inner surface of the cup is/are configured to provide a space between the liner and the cup when the liner is positioned within the cup.

16. The kit of claim 12, further comprising the blade assembly.

17. The kit of claim 16, further comprising a motor base configured to allow an assembly of the blade assembly mechanically coupled to the assembly of the liner and the cup to be mounted thereon for the blending operation.

* * * * *